US009225937B2

(12) United States Patent
Sun et al.

(10) Patent No.: US 9,225,937 B2
(45) Date of Patent: Dec. 29, 2015

(54) ULTRASOUND PAIRING SIGNAL CONTROL IN A TELECONFERENCING SYSTEM

(71) Applicant: Cisco Technology, Inc., San Jose, CA (US)

(72) Inventors: Haohai Sun, Lysaker (NO); Bjorn Winsvold, Lysaker (NO)

(73) Assignee: Cisco Technology, Inc., San Jose, CA (US)

(*) Notice: Subject to any disclaimer, the term of this patent is extended or adjusted under 35 U.S.C. 154(b) by 99 days.

(21) Appl. No.: 14/083,684

(22) Filed: Nov. 19, 2013

(65) Prior Publication Data

US 2015/0109404 A1    Apr. 23, 2015

Related U.S. Application Data

(60) Provisional application No. 61/892,515, filed on Oct. 18, 2013.

(51) Int. Cl.
*H04N 7/15*    (2006.01)

(52) U.S. Cl.
CPC ................................ *H04N 7/15* (2013.01)

(58) Field of Classification Search
CPC ............. H94N 7/15; H94N 7/14; H04R 3/00; G06R 10/1095
USPC ............ 348/14.01–14.16; 705/7.19; 381/303, 381/300, 58, 92, 104, 122
See application file for complete search history.

(56) References Cited

U.S. PATENT DOCUMENTS

| | | | |
|---|---|---|---|
| 2004/0131207 A1* | 7/2004 | Park | 381/104 |
| 2011/0179182 A1* | 7/2011 | Vadla Ravnas | 709/227 |
| 2012/0185291 A1* | 7/2012 | Ramaswamy et al. | 705/7.19 |
| 2013/0106975 A1 | 5/2013 | Chu et al. | |
| 2013/0106976 A1 | 5/2013 | Chu et al. | |
| 2013/0106977 A1 | 5/2013 | Chu et al. | |
| 2013/0108076 A1 | 5/2013 | Chu et al. | |
| 2014/0153747 A1* | 6/2014 | Contolini et al. | 381/122 |

\* cited by examiner

*Primary Examiner* — Melur Ramakrishnaiah
(74) *Attorney, Agent, or Firm* — Edell, Shapiro & Finnan, LLC (57) ABSTRACT

Presented herein are techniques for controlling the level of ultrasound pairing signals generated in a teleconferencing environment. The levels of ultrasound pairing signals transmitted in a meeting room are adjusted automatically based on the ultrasound signal levels received at one or more of the sound receiving devices that can communicate with a teleconferencing endpoint in the meeting room.

24 Claims, 5 Drawing Sheets

ULTRASOUND PAIRING SIGNAL CONTROL IN A TELECONFERENCING SYSTEM

CROSS-REFERENCE TO RELATED APPLICATIONS

This application claims priority to U.S. Provisional Application No. 61/892,515, entitled "ULTRASOUND PAIRING SIGNAL CONTROL IN A VIDEOCOCONFERENCING SYSTEM," filed Oct. 18, 2013, the content of which is hereby incorporated by reference herein.

TECHNICAL FIELD

The present disclosure relates to ultrasound pairing in teleconferencing systems.

BACKGROUND

Teleconferencing, sometimes referred to as videoconferencing (VC), Telepresence, or collaboration systems, allow meetings between persons or groups of people at different locations. The teleconferencing systems may provide both video and audio communication, and include equipment that may be installed in rooms dedicated to conferences/meetings. A meeting participant that has a personal electronic device, such as a mobile phone, tablet computer, laptop computer, etc. may connect his/her device to a teleconferencing system that has been installed in a meeting room.

DESCRIPTION OF EXAMPLE EMBODIMENTS

Overview

Presented herein are techniques for controlling the level of ultrasound pairing signals generated in a teleconferencing environment such that the levels of ultrasound pairing signals transmitted in a meeting room are adjusted automatically based on the ultrasound signal levels received at one or more of the sound receiving devices (microphones) that can communicate with a teleconferencing endpoint in the meeting room. More specifically, a teleconference system controller receives indications of ultrasound signal levels detected at a plurality of sound receiving devices positioned in a meeting room in response to the transmission of ultrasound signals by a sound transducer in the meeting room. The teleconference system controller determines, based on the indications of the ultrasound signal levels, an ultrasound level comparison value. The teleconference system controller then compares the ultrasound level comparison value to one or more ultrasound threshold levels.

Example Embodiments

Figure 1:
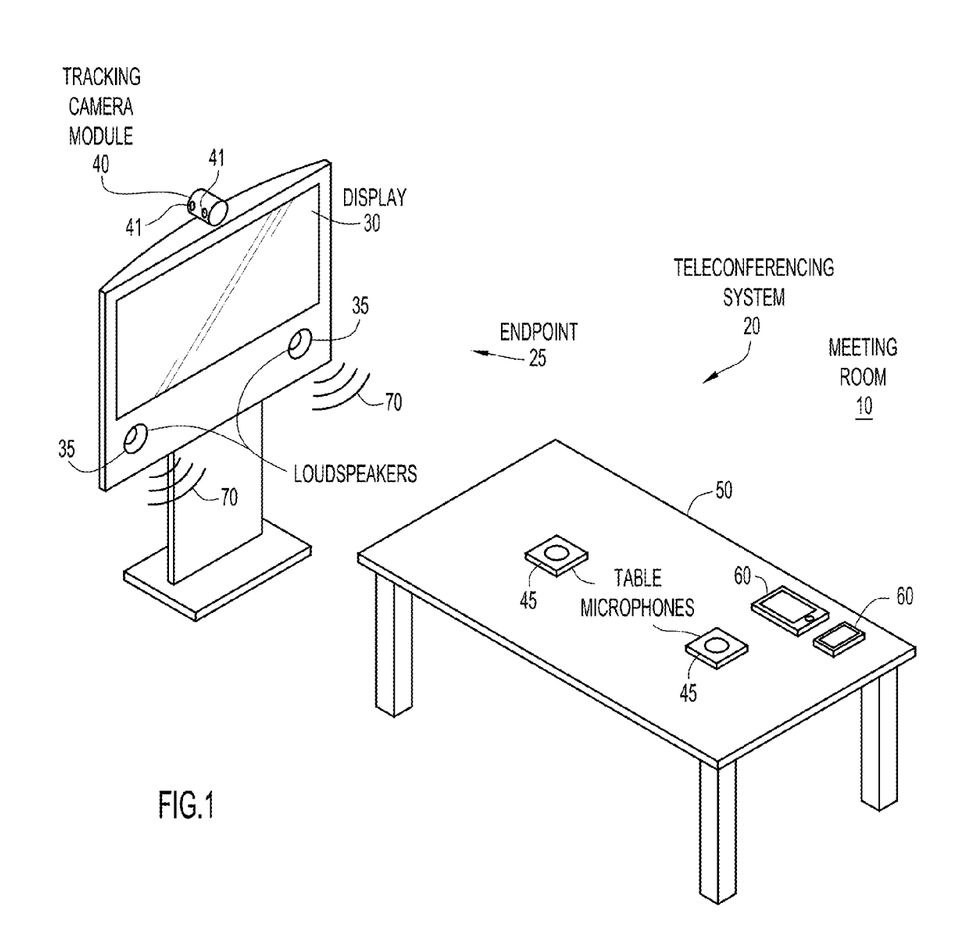
FIG. 1 is a schematic diagram illustrating a teleconferencing system with ultrasound pairing signal control in accordance with examples presented herein.

FIG. 1 is a diagram of a meeting room 10 that includes a teleconferencing system 20 that is configured for use in teleconference meetings. The teleconferencing system 20 comprises an integrated teleconferencing endpoint 25 that includes a display 30 integrated with loudspeakers 35, and an automatic tracking camera module 40 with integrated microphones 41. The teleconferencing system 20 also comprises a teleconference system control module or controller (not shown in FIG. 1), and a plurality of remote sound receiving devices 45 that, in this example, are positioned on a table 50. In the example of FIG. 1, the sound receiving devices 45 include microphones integrated with processing circuitry (e.g., amplifiers, filters, analog-to-digital converters, automatic gain control circuits and the like). As such, the sound receiving devices 45 are sometimes referred to herein simply as table microphones 45.

As shown in FIG. 1, several personal electronic devices 60 are also present in the meeting room 10. These personal electronic devices may be, for example, mobile (cellular) phones such as Smartphones, tablet computers, laptop computers, etc. A meeting attendee (user) may wish to connect his/her personal electronic device 60 to the teleconferencing system 20 for a variety of reasons. For example, a meeting attendee may wish to connect his/her personal electronic device 60 to the teleconferencing system 20 in order to receive meeting video and/or audio on the personal electronic device 60. Alternatively, a personal electronic device 60 may have a built-in microphone, a video camera, and/or other devices for capturing audio or video of the meeting attendee. As such, a meeting attendee may wish to connect a personal electronic device 60 to the teleconferencing system 20 to transmit audio and/or video from the personal electronic device 60 to a remote party (e.g., a meeting attendee at a different location) participating in the teleconference. A meeting attendee may also wish to use the personal electronic device 60 to control the teleconferencing system 20 to, for example, establish a communication session (meeting) to be conducted through the teleconferencing system 20, add/remove participants to/from the meeting, share documents/files, set communication parameters, etc.

In the example of FIG. 1, a personal electronic device 60 may be connected to teleconferencing system 20 through a process referred to as "ultrasound pairing." The ultrasound pairing uses a space-limited, inaudible, and unidirectional broadcast channel that conveys connection information to personal electronic devices 60 that are able to pick up the sound using, for example, an integrated microphone of the personal electronic device. The connection information sent includes, but is not limited to, information that the personal electronic devices 60 may use to connect to the teleconferencing system 20.

More specifically, the teleconferencing endpoint 25 generates and transmits ultrasound pairing signals 70 using, for example, ultrasound waves, via loudspeakers 35. In certain embodiments, the pairing signals 70 may include the network address of the teleconferencing endpoint 25 so that the personal electronic devices 60 can connect to the teleconferencing endpoint 25 using another type of connection, such as a Wi-Fi connection. In addition or alternatively, the pairing signals 70 may include the network address of a server or other control entity associated with the teleconferencing system 20.

In addition to the network address, the ultrasound signals 70 may also contain a randomly generated code that changes periodically. The period at which the code changes may span from a few seconds to a few minutes, depending on security requirements. Once an electronic device 60 connects to the endpoint, the electronic device 60 may be configured to pass the code back to the teleconferencing endpoint 25. Failure by the electronic device 60 to return a correct code to the teleconferencing endpoint 25 may cause the connection between the electronic device 60 and the teleconferencing endpoint 25 to be disabled. This ensures that electronic devices that know the address without being in the meeting room will not be able to reach the functionality of the endpoint 25, since they will not know the code that is only available inside the room.

When a personal electronic device 60 receives the ultrasound pairing signals 70, the personal electronic device 60 decodes the signal to extract the network address. The personal electronic device 60 then uses the network address message to establish a connection with the teleconferencing system 20. The connection between the personal electronic device 60 and the teleconferencing system 20 may be, for example, a Transmission Control Protocol (TCP)/Internet Protocol (IP) connection, a wireless network connection, a Bluetooth connection, etc. Once this connection is established, the personal electronic device 60 may be used to perform any of the functions described above.

The level of the ultrasound pairing signals 70 in the meeting room 10 should be high enough so that the ultrasound signals can reach most personal electronic devices 60 in the meeting room 10 with good signal-to-noise-ratio (SNR). Otherwise, the connection information cannot be successfully recovered by the personal electronic devices 60. In general, the ultrasound signals used for pairing typically have a limited frequency range, e.g., between 20 and 22 kilohertz (kHz).

As noted above, a number of sound receiving devices (e.g., microphones and/or microphone arrays) may also be positioned in the room for speech communication and/or speaker tracking purposes. For example, the table microphones 45 and the microphones 41 integrated into camera module 40 are connected to (or can communicate with) the teleconferencing endpoint 25. During ultrasound pairing, the teleconferencing system 20 is aware of the level at which the ultrasound signals 70 are generated at the loudspeakers 35 (i.e., the teleconferencing system 20 is aware of the volume of the loudspeaker 35 when generating ultrasound signals). However, the acoustics in the meeting room 10 and the distances between the loudspeakers and the various sound receiving devices (e.g., the table microphones 45 and the microphones 41 integrated into camera module 40) may be unknown. As such, the levels of the ultrasounds signals received at the integrated microphones 41 and the table microphones 45 are unknown. As a result, the integrated microphones 41 in the camera module 40 and/or the table microphones 45 may potentially be overloaded by the ultrasound pairing signals generated by the loudspeakers 35. That is, the ultrasound signals 70 may be sufficiently high such that there is insufficient dynamic range remaining for operation of the sound receiving devices to detect speech signals from the meeting attendees. In such situations, the integrated microphones 41 in the camera module 40 and/or the table microphones 45 may be saturated, resulting in the transmission of transient noise through the teleconferencing system 20 to the different meeting locations (e.g., distorted speech communication quality and poor speaker tracking performance, the integrated acoustic echo canceller (AEC) in the teleconference system may malfunction resulting in transmission of distorted echo signals to the far end participants, etc.).

Presented herein are techniques for automatically controlling the levels of the ultrasound pairing signals 70 so as to maintain a balanced and suitable ultrasound level for the pairing, but also to maintain an ultrasound level that does not interfere with speech communication and speaker tracking functionalities. More specifically, the loudspeaker volume (i.e., the level at which the ultrasound pairing signals are transmitted) is adjusted automatically based on the ultrasound signal levels received at sound receiving devices that can communicate (e.g., via analog, digital, wireless, or cable) with the teleconferencing endpoint in the room. In general, the loudspeaker volume control used to set the level of the ultrasound pairing signals is separate and independent from the loudspeaker volume control used to set the level for normal audio/speech communication signals. That is, the level of ultrasound signals projected by the loudspeakers 35 may be set different from the levels of the audio/speech communication signals projected by the loudspeakers 35. As such, the important features in modern teleconferencing, including high-quality audio communication, automatic speaker tracking, and ultrasound pairing can operate together without interfering with each other.

In accordance with examples presented herein, the levels of ultrasound pairing signals detected at all or a subset of the sound receiving devices (e.g., microphones or microphone arrays) connected to the teleconferencing system 20 are estimated. The ultrasound levels can be estimated either in the frequency domain or in the time domain. In the frequency domain, the estimation includes the use of a Fast Fourier Transform (FFT) on each received frame and a summation of the energy in the ultrasound bands. In the time domain, the estimation includes computing ultrasound energy at the output of an ultrasound band-pass or high-pass filter. The obtained ultrasound levels are smoothed over time (frames) to provide more stable/constant estimation results. The temporal-smoothing speed can be either fixed or can be adaptive based on, for example, a fast-increase and/or a slow-decrease style. Further details of the ultrasound level estimation techniques are provided below with reference to FIGS. 4 and 5.

In certain embodiments, the ultrasound levels can be estimated at the teleconferencing endpoint 25 (e.g., if the microphones are directly connected to the endpoint). In other embodiments, the ultrasound levels can also be estimated at processors integrated with the microphones (e.g., the wireless microphone integrated with a processor, the microphone in a mobile device, or the microphones 41 in an intelligent tracking camera 40), and the estimates can be transmitted back to the endpoints (the control entity).

In general, the teleconferencing endpoint 25 (or a central processing unit or other control entity) gathers the ultrasound levels and/or estimates from the considered sound receiving devices and computes the levels relative to the full-scale amplitude (e.g. Decibels relative to full scale (dBFS), relative root-mean-square (RMS) level, etc.). More specifically, if the sampling frequency, the FFT length or the HPF/BPF filters are known, the full-scale ultrasound amplitude/level of the system (the achievable maximum level) can be pre-determined or measured. In run time, the level at which ultrasound signals are actually captured may be computed and compared with the full-scale level to obtain levels relative to the full-scale amplitude. For instance, the results can be represented in dBFS: dBFS_ultrasound=10*log 10(actual ultrasound level/full scale ultrasound level). When the ultrasound signal level is high and close to saturating the microphone, the actual ultrasound level will be very close to the full scale ultrasound level, and the dBFS value will be close 0. Normally, the dBFS values are negative and may range from 0 to −100.

In operation, the highest level (or the averaged level of a highest subset of levels gathered from the considered sound receiving devices), denoted as dBFS_MAX, is selected and compared with predefined thresholds, namely a high or max threshold (threshold_high) for the ultrasound pairing signals and a low or minimum threshold (threshold_low) for the ultrasound pairing signals.

The loudspeaker volume (i.e., the level of the generated ultrasound pairing signals) may be automatically reduced when the dBFS_max value is higher than the threshold_high value (a certain amount higher) so that the sound receiving devices are not saturated/overloaded and the sound receiving devices still have enough dynamic range for audio communication and speaker tracking. Alternatively, the loudspeaker volume (i.e., the level of the generated ultrasound pairing signals) may be increased when the dBFS_max value is lower than threshold_low value in order to make sure that the ultrasound level is not too low for pairing purposes.

The volume range of the loudspeaker is limited to the range defined by volume_low, volume_high. A 0 dB volume may denote the unit amplification gain. In certain examples, threshold_high, threshold_low, volume_low and volume_high may be set to −40 dBFS, −60 dBFS, −35 dB, and 5 dB, respectively, so that the ultrasound pairing, audio communication and speaker tracking functionality can work well in the same room, without interfering each other. These parameter values are merely illustrative, and are not meant to be limiting.

Figure 2:
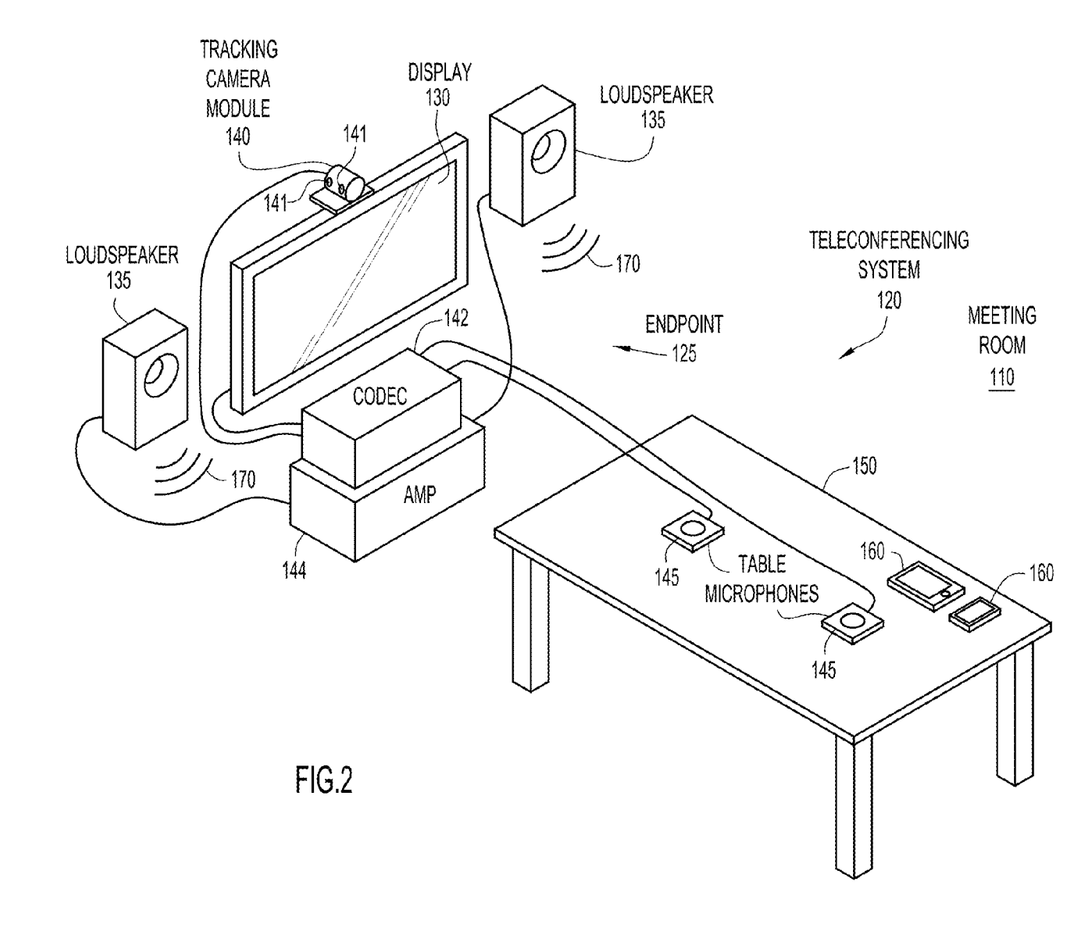
FIG. 2 is a schematic diagram illustrating another teleconferencing system with ultrasound pairing signal control in accordance with examples presented herein.

It is to be appreciated that the teleconferencing environment shown in FIG. 1 is merely illustrative and that the ultrasound pairing control techniques presented herein may be used in other teleconferencing environments. For example, FIG. 2 is a block diagram of another teleconferencing environment in which the ultrasound pairing control techniques presented herein may be used. More particularly, FIG. 2 illustrates a meeting room 110 that includes a teleconferencing system 120. The teleconferencing system 120 comprises a teleconferencing endpoint 125 that includes a display 130, loudspeakers 135, an automatic tracking camera module 140 with integrated microphones 141, a teleconferencing codec 142, and an amplifier 144. While FIG. 1 illustrates an integrated teleconferencing endpoint (i.e., an endpoint formed by a display that is integrated with the other endpoint components), FIG. 2 illustrates a distributed teleconferencing endpoint (i.e., a codec 142 connected to separate devices that form the other endpoint components). The teleconferencing system 120 also comprises remote sound receiving devices 145 that, in this example, are positioned on a table 150. In the example of FIG. 2, the sound receiving devices 145 are microphones integrated with processing circuitry (e.g., amplifiers, filters, analog-to-digital converters, automatic gain control circuits and the like). As such, the sound receiving devices 145 are sometimes referred to herein as table microphones 145.

As shown in FIG. 2, personal electronic devices 160 are also present in the meeting room 110. The codec 142 (or other control module) is configured to generate and provide ultrasound pairing signals 170 (via amplifier 144 and loudspeakers 135) that may be used by the personal electronic devices 160 to connect to the teleconferencing system 120.

In the example of FIG. 2, the volume setting of the amplifier 144 may be unknown by the codec 142. As such, the codec 142 may not know (having information pertaining to) the exact levels of the ultrasound pairing signals level played out of the loudspeakers 135. In such a setup, the ultrasound level may interfere with the sound receiving devices and/or may be dangerous for people sitting in the room. Therefore, it is desirable to control the level of the ultrasound signals 170.

Figure 3:
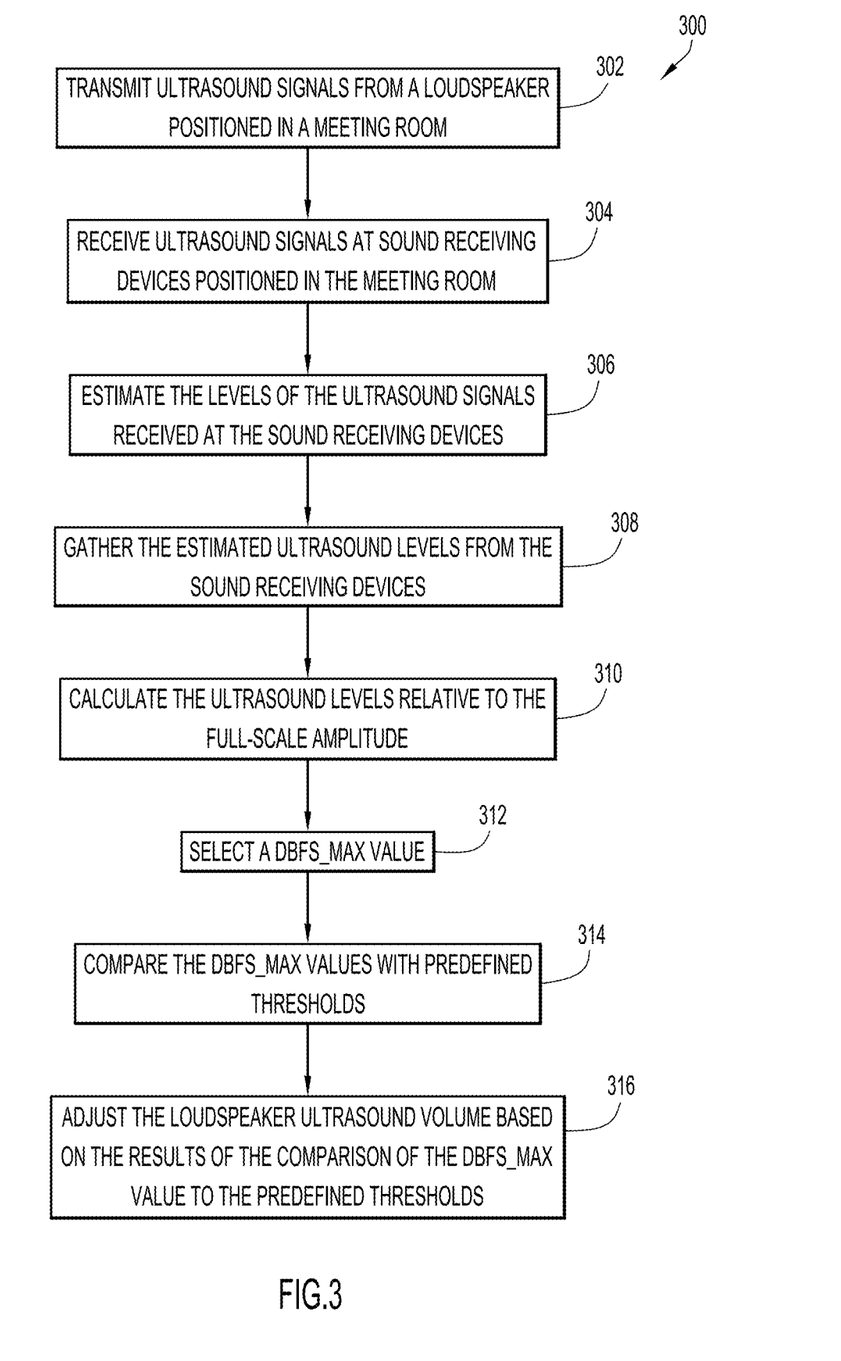
FIG. 3 is a flowchart of the ultrasound pairing control technique in accordance with examples presented herein.

FIG. 3 is a flowchart of an ultrasound pairing signal control method 300 in accordance with examples presented herein. Method 300 begins at 302 where ultrasound signals are transmitted from a loudspeaker positioned in a meeting room. The ultrasound signals may be transmitted at an initial default or predetermined level.

At 304, the ultrasound signals are received at sound receiving devices positioned in the meeting room. The sound receiving devices may comprise, for example, microphones and/or microphone arrays integrated with processing circuitry (e.g., amplifiers, filters, analog-to-digital converters, automatic gain control circuits and the like). At 306, the sound receiving devices estimate the levels of the ultrasound signals received at the sound receiving devices. That is, the sound receiving devices determine the loudness of the ultrasound levels at the location at which the sound receiving devices are positioned. The ultrasound levels can be estimated either in the frequency domain or in the time domain. Further details of the ultrasound level estimation techniques are provided below with reference to FIGS. 4 and 5.

At 308, the estimated ultrasound levels from the sound receiving devices are gathered/collected (e.g., at a teleconference system controller) and at, 310, the ultrasound levels relative to the full-scale amplitude (e.g. Decibels relative to full scale (dBFS), relative root-mean-square (RMS) level, etc.) are calculated. At 312, an ultrasound level comparison value, denoted as dBFS_MAX is selected. The dBFS_MAX value may correspond to, for example, the highest ultrasound level estimated at the sound receiving devices, an averaged level of a highest subset of estimated levels, etc.

At 314, the dBFS_MAX value is compared with predefined thresholds, namely a high or maximum threshold (threshold_high) for the ultrasound pairing signals and a low or minimum threshold (threshold_low) for the ultrasound pairing signals. At 316, the loudspeaker ultrasound volume (i.e., the level at which the loudspeaker transmits/projects ultrasound signals) may be adjusted based on the results of the comparison of the dBFS_MAX value to the predefined thresholds. For example, the loudspeaker volume may be automatically reduced when the dBFS_max value is higher than the threshold high value so that the sound receiving devices are not saturated/overloaded and the sound receiving devices still have enough dynamic range for audio communication and speaker tracking. Alternatively, the loudspeaker volume (i.e., the level of the generated ultrasound pairing signals) may be increased when the dBFS_max value is lower than threshold low value in order to make sure that the ultrasound level is not too low for pairing purposes.

In one example, at 316, an ideal volume for the loudspeaker while generating ultrasound signals is computed based on the comparison of dBFS_MAX value to the predefined thresholds. The loudspeaker volume range may be limited to the range volume_low, volume_high. The loudspeaker may then generate subsequent ultrasound signals 322 at the ideal level.

Figure 4:
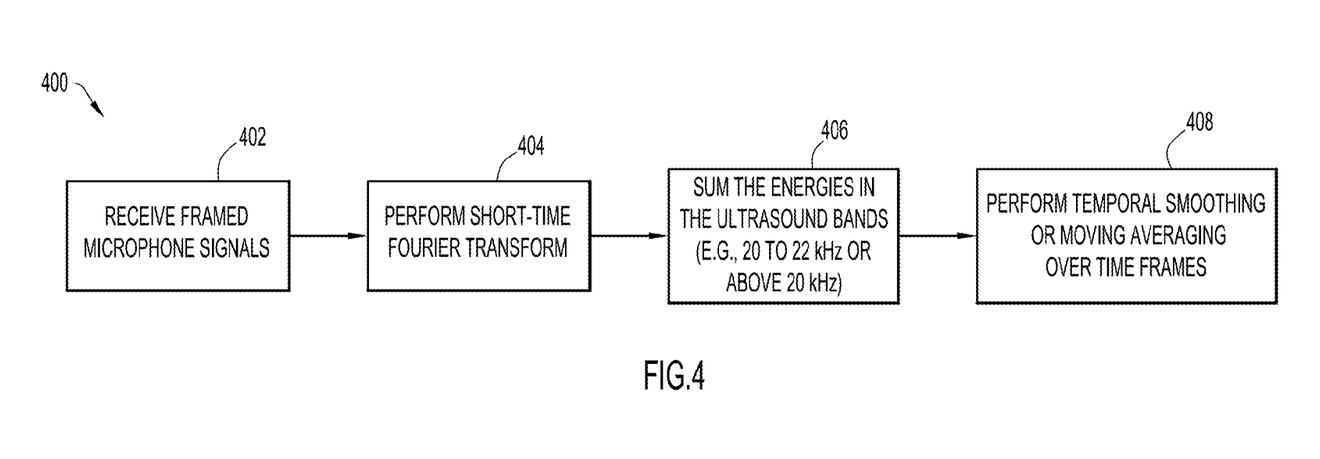
FIG. 4 is a flowchart illustrating frequency-domain ultrasound level estimation techniques in accordance with examples presented herein.

FIG. 4 is a flowchart illustrating a method 400 for frequency-domain ultrasound level estimation at a sound receiving device in accordance with examples presented herein. Method 400 starts at 402 where time frames of microphone (microphone array) signals are received at, for example, processing hardware/software associated with a microphone or microphone array. At 404, a short-time Fourier transform is performed on the microphone signals. At 406, the energy in the ultrasound pairing signal bands (e.g., 20 to 22 kilohertz (kHz) or above 20 kHz) are summed. At 408, temporal smoothing or moving averaging over time frames is performed.

Figure 5:
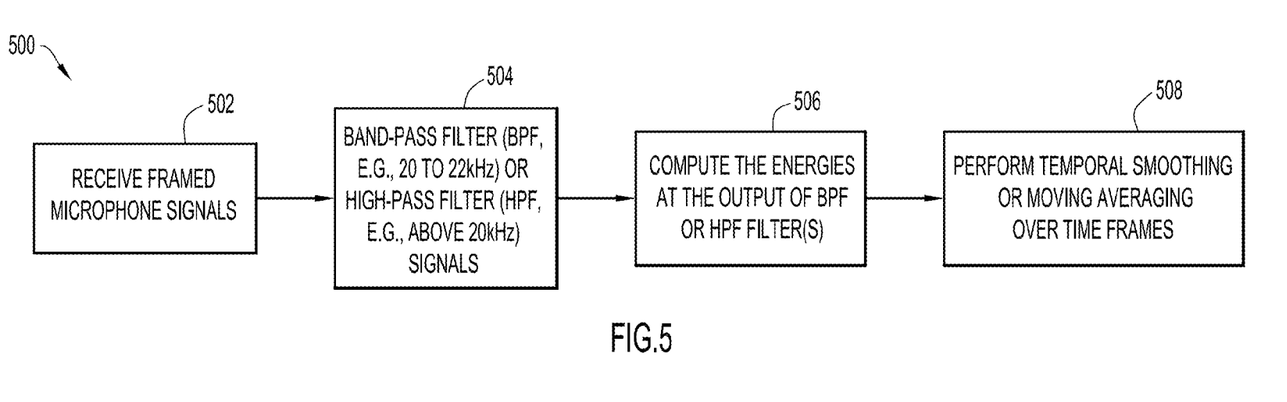
FIG. 5 is a flowchart illustrating time-domain ultrasound level estimation techniques in accordance with examples presented herein.

FIG. 5 is a flowchart illustrating a method 500 for time-domain ultrasound level estimation at a sound receiving device in accordance with examples presented herein. Method 500 starts at 502 where time frames of microphone signals are obtained. At 504, the microphone signals are filtered. This filtering may be band-pass filtering (e.g., to obtain signals in the range of 20-22 kHz) or high-pass filtering (e.g., to obtain signals above 20 kHz). At 506, the energy at the output of the filters are computed. At 508, temporal smoothing or moving averaging over time frames is performed.

In one example, temporal (time) smoothing may be implemented as given below in Equation 1 using a one-pole low-pass filter, with a time constant $\alpha$ (alpha)

Equation 1:

$$\text{Level\_smooth}(n) = (1-\alpha) * \text{Level\_smooth}(n-1) + \alpha * \text{Level}(n)$$

where n is the short-time frame index, Level(n) is the estimated ultrasound level of current frame, Level_smooth(n−1) is the temporal-smoothed level of last frame, Level_smooth (n) is the temporal smoothed level of current frame, $\alpha$ is the time constant or smoothing factor.

In general, a larger $\alpha$ value leads to a faster updating and a lower $\alpha$ value results in a slower updating. The $\alpha$ value can either be a fixed value or an adpative value. For example, when Level(n) is larger than Level_smooth(n−1), $\alpha$ may be set to be a higher value, and if Level(n) is lower than Level_smooth(n−1), $\alpha$ may be set to be a lower value.

In certain examples, only sound receiving devices that can satisfy several pre-conditions may be considered to determine ultrasound pairing signal levels. These pre-conditions may include, for example, (1) a requirement that the ultrasound level received at a sound receiving device is (by a certain multiple) higher than the noise level, and (2) a requirement that the waveform of the ultrasound signal received at a sound receiving device is, to a certain degree, coherent with the reference ultrasound signal being projected by the loudspeaker. The coherence can be obtained either by calculating the maxima of the cross-correlation function between sound receiving device and loudspeaker ultrasound signals, or by estimating the ultrasound acoustic echo level using conventional acoustic echo level estimators. A further precondition may be that the average energy of ultrasound band is, to a certain degree or amount, higher than the average energy of neighboring frequency bands, e.g. 18 kHz to 20 kHz.

The above pre-conditions may be useful to improve system robustness, since they can be used to distinguish between the ultrasound played back via a loudspeaker connected to the video conference endpoint and the ultrasound played by other devices or generated by other sound sources (high frequency typing noise, construction noise, or human being speech) in a meeting room. It is to be appreciated that the above mentioned conditions can be released or omitted depending on system configuration, robustness, complexity, and detection accuracy requirements.

Figure 6:
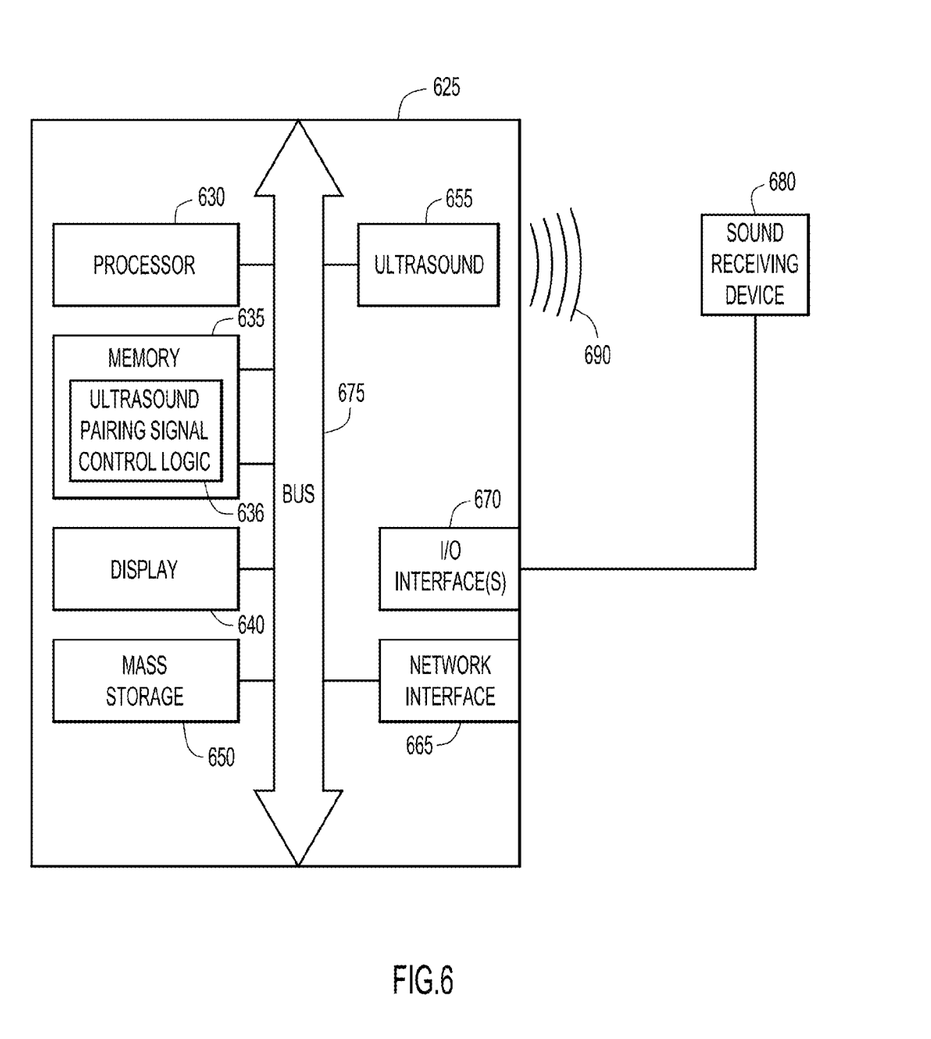
FIG. 6 is a block diagram of a teleconferencing system controller configured to support the ultrasound pairing signal control techniques in accordance with examples presented herein.

FIG. 6 is a block diagram of a teleconferencing system controller 625 in accordance with examples presented herein. The teleconferencing system controller 625 may be, or may be part of, a teleconferencing endpoint, a server, etc. Merely for ease of illustration, the teleconferencing system controller 625 is illustrated as including the functionality of a teleconferencing endpoint and, as such, is referred to below as a teleconferencing endpoint 625.

The teleconferencing endpoint 625 includes a processor 630 and a memory 635 that comprises ultrasound pairing signal control logic 636. Memory 635 may comprise read only memory (ROM), random access memory (RAM), magnetic disk storage media devices, optical storage media devices, flash memory devices, electrical, optical, or other physical/tangible memory storage devices. The processor 630 is, for example, a microprocessor or microcontroller that executes instructions for the ultrasound pairing signal control logic 636. Thus, in general, the memory 635 may comprise one or more tangible (non-transitory) computer readable storage media (e.g., a memory device) encoded with software comprising computer executable instructions and when the software is executed (by the processor 630) it is operable to perform the ultrasound pairing control operations described herein.

The teleconferencing endpoint 625 also comprises a display 640 that may be, for example, a plasma display, liquid crystal display (LCD), cathode ray tube (CRT), light emitting diode display, etc. The display 640 is configured to display video relating to a teleconference, as well as to display control information for controlling the teleconferencing endpoint 625. The teleconferencing system endpoint 625 further comprises a mass storage unit 650, one or more input/output (I/O) interfaces 670, one or more network interfaces 665, and an ultrasound unit 655. The I/O interface(s) 670 are operable to connect to external peripherals, such as a keyboard, mouse, printer, scanner, microphones, speakers, and the like. The I/O interface(s) 670 may include serial, parallel, HDMI, USB and other I/O connections.

In the example of FIG. 6, a sound receiving device 680 is connected to one of the I/O interfaces 670. The sound receiving device 680 may be a microphone or other sound transducer and associated circuitry, such as amplifiers, filters, analog-to-digital converters, automatic gain control circuits and the like.

The mass storage unit 650 is connected to the processor 630 via the bus 655 and is configured to store information and data for setting up and managing teleconference/videoconference sessions. The network interface(s) 665 are configured to allow network communication over data networks. For example, the network interface(s) 665 may connect the teleconferencing endpoint 625 to a local area network (LAN), a wide area network (WAN) or the Internet. The network interface(s) 665 may be wired interfaces and/or interfaces configured to establish network connections via Wi-Fi, Wi-MAX and/or cellular networks. The network interface(s) 665 may also establish network connections via Bluetooth or other radio networks The ultrasound unit 655 is also connected to the processor 630 via the bus 675 and is configured to emit ultrasound sound waves 690, such as when transmitting the ultrasound messages described above. As such, the ultrasound unit 655 includes a sound transducer (e.g., a loudspeaker, piezoelectric speaker, etc. The ultrasound unit 655 may also include the electronic circuitry necessary for driving the loudspeaker, such as amplifiers, filters, coils, etc.

In summary, the loudspeaker volume for ultrasound pairing is automatically adjusted by analyzing the ultrasound signal levels received at distributed sound receiving devices (e.g., microphones and/or microphone arrays) in a meeting room. The robustness of the technique is controlled using temporal smoothing, noise level estimation, microphone-loudspeaker signal coherence estimation, and signal spectral analysis techniques. These techniques enable the important features of modern teleconferencing, such as high-quality audio communication, speaker tracking, and ultrasound pairing, etc. to operate together without interfering each other. The automatic volume control mechanism may be turned on only when ultrasound pairing feature is enabled in the room.

In summary, a method is provided comprising: receiving, at a teleconference system controller, indications of ultrasound signal levels detected at a plurality of sound receiving devices positioned in a meeting room in response to the transmission of ultrasound signals by a sound transducer in the meeting room; determining, based on the indications of the ultrasound signal levels, an ultrasound level comparison value; and comparing the ultrasound level comparison value to one or more ultrasound threshold levels.

Similarly, an apparatus is provided comprising: a sound transducer configured to transmit ultrasound signals in a meeting room; one or more interfaces configured for communication with one or more sound receiving devices positioned in the meeting room; and a processor coupled to the sound transducer and the one or more interfaces. The processor configured to: receive indications of ultrasound signal levels detected at the one or more sound receiving devices positioned in the meeting room in response to the transmission of the ultrasound signals by the sound transducer in the meeting room; determine, based on the indications of the ultrasound signal levels, an ultrasound level comparison value; and compare the ultrasound level comparison value to one or more ultrasound threshold levels.

In addition, a system is provided comprising a sound transducer to transmit ultrasound signals in the meeting room; one or more sound receiving devices configured to receive the ultrasound signals transmitted by the sound transducer and to estimate the levels of the received ultrasound signals; and a teleconference system controller. The teleconference system controller is configured to: receive indications of the estimated ultrasound signal levels from the one or more sound receiving devices; determine, based on the indications of the ultrasound signal levels, an ultrasound level comparison value; and compare the ultrasound level comparison value to one or more ultrasound threshold levels.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
    receiving, at a teleconference system controller, indications of ultrasound signal levels detected at a plurality of sound receiving devices positioned in a meeting room in response to the transmission of ultrasound signals by a sound transducer in the meeting room;
    determining, based on the indications of the ultrasound signal levels, an ultrasound level comparison value; and
    comparing the ultrasound level comparison value to one or more ultrasound threshold levels.

2. The method of claim 1, further comprising:
    adjusting a volume of the sound transducer for transmitting the ultrasound signals based on the comparison of the ultrasound level comparison value to the one or more ultrasound threshold levels.

3. The method of claim 2, further comprising:
    comparing the ultrasound level comparison value to a predetermined maximum ultrasound level for the meeting room; and
    when the ultrasound comparison value is greater than the predetermined maximum ultrasound level, reducing a volume of the sound transducer for transmitting the ultrasound signals.

4. The method of claim 2, further comprising:
    comparing the ultrasound level comparison value to a predetermined minimum ultrasound level for the meeting room; and
    when the ultrasound comparison value is less than the predetermined minimum ultrasound level, increasing the volume of the sound transducer for transmitting the ultrasound signals.

5. The method of claim 1, wherein determining an ultrasound level comparison value comprises:
    determining the highest ultrasound level estimated at the sound receiving devices; and
    selecting the highest ultrasound level estimated at the sound receiving devices as the ultrasound level comparison value.

6. The method of claim 1, wherein determining an ultrasound level comparison value comprises:
    computing an average of ultrasound signal levels detected at a subset of the plurality of sound receiving devices; and
    selecting the computed average as the ultrasound level comparison value.

7. The method of claim 6, wherein computing an average of ultrasound signal levels detected at a subset of the plurality of sound receiving devices comprises:
    computing an average of the highest ultrasound levels detected at a subset of the plurality of sound receiving devices.

8. The method of claim 1, further comprising:
    determining whether the indications of ultrasound signal levels detected at each of the plurality of sound receiving devices satisfy one or more preconditions prior to using the indications of the ultrasound signal levels to determine the ultrasound level comparison value.

9. The method of claim 8, wherein determining whether the indications of ultrasound signal levels detected at each of the plurality of sound receiving devices satisfy one or more preconditions comprises:
    determining whether the ultrasound level received at each of the plurality of sound receiving device is a certain amount higher than the noise level.

10. The method of claim 8, wherein determining whether the indications of ultrasound signal levels detected at each of the plurality of sound receiving devices satisfy one or more preconditions comprises:
    determining whether a waveform of the ultrasound signals received at each of the plurality of sound receiving device is at least partially coherent with the ultrasound signal projected by the sound transducer.

11. The method of claim 8, wherein determining whether the indications of ultrasound signal levels detected at each of the plurality of sound receiving devices satisfy one or more preconditions comprises:
    determining whether the average energy in an ultrasound band associated with the ultrasound levels received at each of the plurality of sound receiving device is a certain amount higher than the average energy of neighboring frequency bands.

12. An apparatus comprising:
- a sound transducer configured to transmit ultrasound signals in a meeting room;
- one or more interfaces configured for communication with one or more sound receiving devices positioned in the meeting room; and
- a processor coupled to the sound transducer and the one or more interfaces, the processor configured to:
  - receive indications of ultrasound signal levels detected at the one or more sound receiving devices positioned in the meeting room in response to the transmission of the ultrasound signals by the sound transducer in the meeting room;
  - determine, based on the indications of the ultrasound signal levels, an ultrasound level comparison value; and
  - compare the ultrasound level comparison value to one or more ultrasound threshold levels.

13. The apparatus of claim 12, wherein the processor is further configured to:
- adjust a volume of the sound transducer for transmitting the ultrasound signals based on the comparison of the ultrasound level comparison value to the one or more ultrasound threshold levels.

14. The apparatus of claim 13, wherein the processor is further configured to:
- compare the ultrasound level comparison value to a predetermined maximum ultrasound level for the meeting room; and
- when the ultrasound comparison value is greater than the predetermined maximum ultrasound level, reduce a volume of the loudspeaker for transmitting the ultrasound signals.

15. The apparatus of claim 13, wherein the processor is further configured to:
- compare the ultrasound level comparison value to a predetermined minimum ultrasound level for the meeting room; and
- when the ultrasound comparison value is less than the predetermined minimum ultrasound level, increase the volume of the loudspeaker for transmitting the ultrasound signals.

16. The apparatus of claim 12, wherein to determine an ultrasound level comparison value the processor is configured to:
- determine the highest ultrasound level estimated at the sound receiving devices; and
- select the highest ultrasound level estimated at the sound receiving devices as the ultrasound level comparison value.

17. The apparatus of claim 12, wherein to determine an ultrasound level comparison value the processor is configured to:
- compute an average of ultrasound signal levels detected at a subset of the plurality of sound receiving devices; and
- select the computed average as the ultrasound level comparison value.

18. The apparatus of claim 17, wherein to compute an average of ultrasound signal levels detected at a subset of the plurality of sound receiving devices the processor is configured to:
- compute an average of the highest ultrasound levels detected at a subset of the plurality of sound receiving devices.

19. A system comprising:
- a sound transducer to transmit ultrasound signals in the meeting room;
- one or more sound receiving devices configured to receive the ultrasound signals transmitted by the sound transducer and to estimate the levels of the received ultrasound signals;
- a teleconference system controller configured to:
  - receive indications of the estimated ultrasound signal levels from the one or more sound receiving devices;
  - determine, based on the indications of the ultrasound signal levels, an ultrasound level comparison value; and
  - compare the ultrasound level comparison value to one or more ultrasound threshold levels.

20. The system of claim 19, wherein the teleconference system controller is configured to:
- adjust a volume of the sound transducer for transmitting the ultrasound signals based on the comparison of the ultrasound level comparison value to the one or more ultrasound threshold levels.

21. The system of claim 20, wherein the teleconference system controller is configured to:
- compare the ultrasound level comparison value to a predetermined maximum ultrasound level for the meeting room; and
- when the ultrasound comparison value is greater than the predetermined maximum ultrasound level, reduce a volume of the loudspeaker for transmitting the ultrasound signals.

22. The system of claim 20, wherein the teleconference system controller is configured to:
- compare the ultrasound level comparison value to a predetermined minimum ultrasound level for the meeting room; and
- when the ultrasound comparison value is less than the predetermined minimum ultrasound level, increase the volume of the loudspeaker for transmitting the ultrasound signals.

23. The system of claim 19, wherein to determine an ultrasound level comparison value the teleconference system controller is configured to:
- determine the highest ultrasound level estimated at the sound receiving devices; and
- select the highest ultrasound level estimated at the sound receiving devices as the ultrasound level comparison value.

24. The system of claim 19, wherein to determine an ultrasound level comparison value the teleconference system controller is configured to:
- compute an average of ultrasound signal levels detected at a subset of the plurality of sound receiving devices; and
- select the computed average as the ultrasound level comparison value.

* * * * *